United States Patent
Ramsdell et al.

(10) Patent No.: US 12,016,273 B2
(45) Date of Patent: Jun. 25, 2024

(54) IRRIGATION SYSTEM AND RESERVOIR WITH SELF-SEALING OPENINGS

(71) Applicant: LL Enterprises, LLC, Denver, CO (US)

(72) Inventors: Jeffrey Ramsdell, Denver, CO (US); Lindsay Marker, Aurora, CO (US)

(73) Assignee: LL Enterprises, LLC, Denver, CO (US)

( * ) Notice: Subject to any disclaimer, the term of this patent is extended or adjusted under 35 U.S.C. 154(b) by 0 days.

(21) Appl. No.: 17/752,709

(22) Filed: May 24, 2022

(65) Prior Publication Data
US 2022/0369576 A1 Nov. 24, 2022

Related U.S. Application Data

(60) Provisional application No. 63/192,415, filed on May 24, 2021.

(51) Int. Cl.
*A01G 25/06* (2006.01)

(52) U.S. Cl.
CPC .................................... *A01G 25/06* (2013.01)

(58) Field of Classification Search
CPC .............................. A01G 25/06; A01G 27/006
See application file for complete search history.

(56) References Cited

U.S. PATENT DOCUMENTS

| | | | |
|---|---|---|---|
| 2,791,347 A * | 5/1957 | Boehm | A47G 29/14 165/45 |
| 3,050,801 A | 8/1962 | Downey | |
| 3,233,627 A | 2/1966 | Cebula | |
| 3,345,774 A * | 10/1967 | Delbuguet | A01G 29/00 47/44 |
| 3,885,742 A | 5/1975 | Menzel | |
| 4,092,002 A | 5/1978 | Grosse et al. | |
| 4,509,692 A | 4/1985 | Moss | |
| 5,024,555 A | 6/1991 | York | |
| 5,251,938 A | 10/1993 | Erickson | |
| 5,507,536 A | 4/1996 | Oliveto et al. | |
| 5,918,412 A * | 7/1999 | Shen | A01G 29/00 47/48.5 |

(Continued)

FOREIGN PATENT DOCUMENTS

| | | |
|---|---|---|
| CN | 1356027 | 7/2002 |
| CN | 105409719 | 7/2018 |

(Continued)

*Primary Examiner* — Monica L Perry
*Assistant Examiner* — Aaron M Rodziwicz
(74) *Attorney, Agent, or Firm* — Sheridan Ross P.C.

(57) ABSTRACT

An irrigation system having a reservoir with self-sealing openings is provided. The reservoir comprises a body having an outer surface and a cavity for storing fluid. The reservoir also includes a plurality of self-sealing openings on the outer surface and configured to move between a first configuration in which the self-sealing openings are closed and a second configuration in which the self-sealing openings are open and permit fluid to release from the cavity to a target zone. The self-sealing openings are in the first configuration when a fluid pressure in the reservoir is at least one of zero pressure or negative pressure and the self-sealing openings are in the second configuration when the fluid pressure in the reservoir is a positive pressure relative to an external pressure.

14 Claims, 4 Drawing Sheets

(56) References Cited

U.S. PATENT DOCUMENTS

| | | | | |
|---|---|---|---|---|
| 6,598,338 B2* | 7/2003 | Buss | ............. | A01G 27/006 |
| | | | | 47/48.5 |
| 8,065,832 B2 | 11/2011 | King | | |
| 8,381,437 B2 | 2/2013 | Ciudaj | | |
| 9,609,812 B2 | 4/2017 | Ciudaj | | |
| 9,999,894 B2 | 6/2018 | Becktell | | |
| 10,537,073 B2 | 1/2020 | Turk et al. | | |
| 2005/0279856 A1 | 12/2005 | Nalbandian et al. | | |
| 2008/0041978 A1* | 2/2008 | Keren | ............. | A01G 25/02 |
| | | | | 239/542 |
| 2013/0272791 A1* | 10/2013 | Bayley | ............. | A01G 25/06 |
| | | | | 405/37 |
| 2019/0154181 A1 | 5/2019 | Nelson et al. | | |
| 2020/0068820 A1 | 3/2020 | Kohavi et al. | | |

FOREIGN PATENT DOCUMENTS

| | | |
|---|---|---|
| CN | 207589726 | 7/2018 |
| CN | 110291970 | 10/2019 |
| CN | 211607727 | 10/2020 |
| KR | 20-2011-0008962 | 9/2011 |

* cited by examiner

IRRIGATION SYSTEM AND RESERVOIR WITH SELF-SEALING OPENINGS

CROSS REFERENCE TO RELATED APPLICATIONS

This application claims the benefit of U.S. Provisional Application No. 63/192,415, entitled "IRRIGATION SYSTEM" and filed on May 24, 2021, which application is incorporated herein by reference in its entirety.

FIELD

Embodiments of the present invention generally relate to an irrigation system, and more specifically to a deep subterranean irrigation system having a reservoir with self-sealing openings.

BACKGROUND

Typical irrigation systems include drip lines positioned on the top of the ground surface, drip lines positioned just below the ground surface, stationary sprinklers that spray water onto the top of the ground surface, or movable sprinkler systems that spray water onto the top of the ground surface. Other conventional irrigation systems may include a porous hose buried in the ground that may often fail to release fluid into the ground. Further, additional conventional irrigation systems may have permanently opened apertures that allow for roots or other debris to clog or otherwise damage the system. The existing systems are not as durable and/or as effective or efficient at providing water and/or nutrients to the root structure of the crop or target planting.

SUMMARY

Embodiments of the present invention relate to a novel system, device, and method for providing an irrigation system with a subterranean component. The novel irrigation system provided herein comprises a reservoir that allows the system to efficiently and effectively provide fluid to the root system of a plant being watered or treated and is capable of self-sealing to prevent debris from entering the reservoir and/or clogging the apertures. A plant or plants may include, for example, crops, trees, shrubs, vegetation, and/or any living plants that may be watered by the irrigation system.

Thus, it is one aspect of various embodiments of the present invention to provide a subterranean irrigation system capable of interfacing with existing surface irrigation systems employed with vineyards, orchards, and other perennial agricultural systems.

It is another aspect of various embodiments of the present invention to provide an irrigation system that can increase the volume of fluid delivered to the root structure of a plant and decrease the overall volume of fluid that is required to irrigate using existing surface systems. One advantage of some embodiments is that the amount or fluid delivered to the plant's roots is increased while the amount of fluid used overall is decreased. Embodiments of the present invention also allow fluid to penetrate more deeply under the ground surface and various embodiments promote deeper, healthier root growth than may be achieved using surface irrigation.

Further example aspects of the present disclosure include:

A self-sealing reservoir for dispersing fluid to a target zone according to at least one embodiment of the present disclosure comprises a body having an outer surface defining a first surface opposite a second surface and a cavity for storing fluid; and a plurality of self-sealing openings on at least one of the first surface or the second surface, the plurality of self-sealing openings configured to move between a first configuration in which the plurality of self-sealing openings are closed and a second configuration in which the plurality of self-sealing openings are open and permit fluid to release from the cavity to the target zone, wherein the plurality of self-sealing openings are in the first configuration when the fluid pressure in the reservoir is at least one of zero pressure or negative pressure and the self-sealing openings are in the second configuration when the fluid pressure in the reservoir is a positive pressure relative to an external pressure.

Any of the aspects herein, wherein the self-sealing openings are positioned parallel to a center or longitudinal axis of the reservoir and perpendicular to a horizontal curvature of the outer surface.

Any of the aspects herein, wherein the self-sealing openings comprise linear slits parallel to the center or longitudinal axis.

Any of the aspects herein, wherein the self-sealing openings have a length between about ¼ inch to about 1.5 inches.

Any of the aspects herein, wherein the self-sealing openings are cut into the outer surface to the cavity at an angle between about 30 degrees to 60 degrees relative to a plane tangential to the outer surface. Any of the aspects herein, wherein the self-sealing openings are cut into the outer surface to the cavity at an angle between about −5 degrees to 5 degrees relative to the plane tangential to the outer surface. Any of the aspects herein, wherein the self-sealing openings are cut into the outer surface of the cavity at an angle between about 85 degrees to 95 degrees relative to the plane tangential to the outer surface.

Any of the aspects herein, wherein the reservoir has a length L, a width W, and a depth D, wherein the length L is greater than the width W and the width W is greater than the depth D.

Any of the aspects herein, wherein the body extends from a first end to a second end, wherein the reservoir is in fluid communication with a fluid source at the first end and comprises a pointed tip at the second end.

Any of the aspects herein, wherein the outer surface is convex.

Any of the aspects herein, wherein the reservoir is one piece.

Any of the aspects herein, wherein the reservoir comprises at least one of non-porous polyethylene, high-density polyethylene, or polypropylene.

A self-sealing non-porous reservoir for dispersing fluid to a target zone according to at least one embodiment of the present disclosure comprises a body extending from a first end to a second end along a center or longitudinal axis, the reservoir having an outer surface defining a first surface opposite a second surface and a cavity for storing fluid, wherein the outer surface is concave; and a plurality of self-sealing openings on at least one of the first surface or the second surface and positioned parallel to the center or longitudinal axis and perpendicular to a horizontal curvature of the concave outer surface, the plurality of self-sealing openings configured to move between a first configuration in which the plurality of self-sealing openings are closed and a second configuration in which the plurality of self-sealing openings are open and permit fluid to release from the cavity to the target zone, wherein the plurality of self-sealing openings are in the first configuration when the fluid pressure in the reservoir is at least one of zero pressure or negative pressure and the self-sealing openings are in the second configuration when the fluid pressure in the reservoir is a positive pressure relative to an external pressure.

Any of the aspects herein, wherein the reservoir is one piece.

A system for dispersing fluid into soil proximate a root zone of a plant according to at least one embodiment of the present disclosure comprises a connector comprised of a connecting portion and tubing, the connecting portion connected to a surface irrigation hose; one or more fastener straps connected to the connector; and a reservoir connected to the tubing, wherein the reservoir has an elongated shape extending from a first end to a second end, wherein the reservoir has an oval shape when viewed in cross-section, and wherein the reservoir comprises a plurality of self-sealing openings on an outer surface, the self-sealing openings permitting the release of fluid from the reservoir and into the soil.

Any of the aspects herein, wherein the reservoir forms an underground aquifer that supplies water to the root zone of the plant.

Any of the aspects herein, wherein the connector is comprised of at least one of non-porous polyethylene, high-density polyethylene, or polypropylene.

Any of the aspects herein, wherein the reservoir is comprised of at least one of non-porous polyethylene, high-density polyethylene, or polypropylene.

Any of the aspects herein, wherein the fluid comprises one or more of water, nutrients, chemicals, or treatments.

Any of the aspects herein, wherein the self-sealing openings are configured to move between a first configuration in which the self-sealing openings are sealed and a second configuration in which the self-sealing openings are open.

Any of the aspects herein, wherein the self-sealing openings are in the first configuration when the fluid pressure in the reservoir is at least one of zero pressure or negative pressure and the self-sealing openings are in the second configuration when the fluid pressure in the reservoir is a positive pressure relative to an external pressure.

Any of the aspects herein, wherein the self-sealing openings are positioned parallel to a center or longitudinal axis of the reservoir and perpendicular to a horizontal curvature of the outer surface.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

For purposes of further disclosure, the following references generally related to irrigation systems are hereby incorporated by reference in their entireties:

U.S. Pat. No. 8,381,437 to Ciudaj and issued on Feb. 26, 2013; and

U.S. Pat. No. 8,065,832 to King and issued on Nov. 29, 2011.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

The above-described embodiments, objectives, and configurations are neither complete nor exhaustive. The Summary is neither intended nor should it be construed as being representative of the full extent and scope of the present invention. Moreover, references made herein to "the present disclosure" or aspects thereof should be understood to mean certain embodiments of the present invention and should not necessarily be construed as limiting all embodiments to a particular description. The present disclosure is set forth in various levels of detail in the Summary as well as in the attached drawings and the Detailed Description and no limitation as to the scope of the present invention is intended by either the inclusion or non-inclusion of elements, components, etc. in this Summary. Additional aspects of the present invention will become more readily apparent from the Detailed Description, particularly when taken together with the drawings.

It is to be appreciated that any feature described herein can be claimed in combination with any other feature(s) as described herein, regardless of whether the features come from the same described embodiment. Any one or more aspects described herein can be combined with any other one or more aspects described herein. Any one or more features described herein can be combined with any other one or more features described herein. Any one or more embodiments described herein can be combined with any other one or more embodiments described herein.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Industrial-scale agriculture uses enormous amounts of water, nutrients, chemicals, and/or treatments for watering and treating crops, plants, trees, etc. The cost of conventional large-scale equipment and power generation to supply such water and nutrients is expensive, particularly as water is becoming increasingly scarce and the cost of water, nutrients, chemicals, and other treatments increases. Further, crop health and crop yields are also dependent on how and where water, nutrients, chemicals, and/or treatments are delivered in relation to roots of the target crops, plants, or trees. Conventional systems may only provide water at a ground surface of the plant, which may not penetrate deep enough to nourish the entire root. Other conventional systems may use a porous housing positioned underground. However, the porosity of these systems is problematic as they often fail to release fluid into the ground whether due to manufacturing defects and/or systems having low pressure that fail to force fluids out of the pores. Further, some treatments or nutrients such as, for example, fish emulsion, may be too thick to push through pores sized for water flow. Other conventional systems may use permanent holes in the walls that always stay open. Such systems may allow for root intrusion (where roots grow into the device) and other forms of clogging from debris such as soil, rocks, and pests.

Thus, at least one embodiment of the present disclosure provides for a system configured to inject water, nutrients, chemicals, and/or other treatments directly into the ground and forms one or more mini-aquifers using a reservoir at a specific target location where an ideal root system is desired. Such system will avoid almost all evaporation inherent to above-surface applications, thus saving as much as the majority of water, nutrients, and/or chemicals otherwise needed. The system also beneficially uses less energy than conventional systems to pump and distribute the water, nutrients, and/or chemicals to the target location because less water, nutrients, and/or chemicals are used and thus, less water, nutrients, and/or chemicals are pumped. Further, the irrigation system is configured to move between a first configuration in which one or more self-sealing openings on the reservoir are self-sealed and do not allow fluid to exit the reservoir and also prevents debris from entering the reservoir and a second configuration in which the one or more self-sealing openings open and fluid is allowed to exit the reservoir. Thus, such system will allow fluid to be released, even under low pressure and even when using thicker fluids and also self-seal to prevent debris from entering the reservoir.

Figure 1:
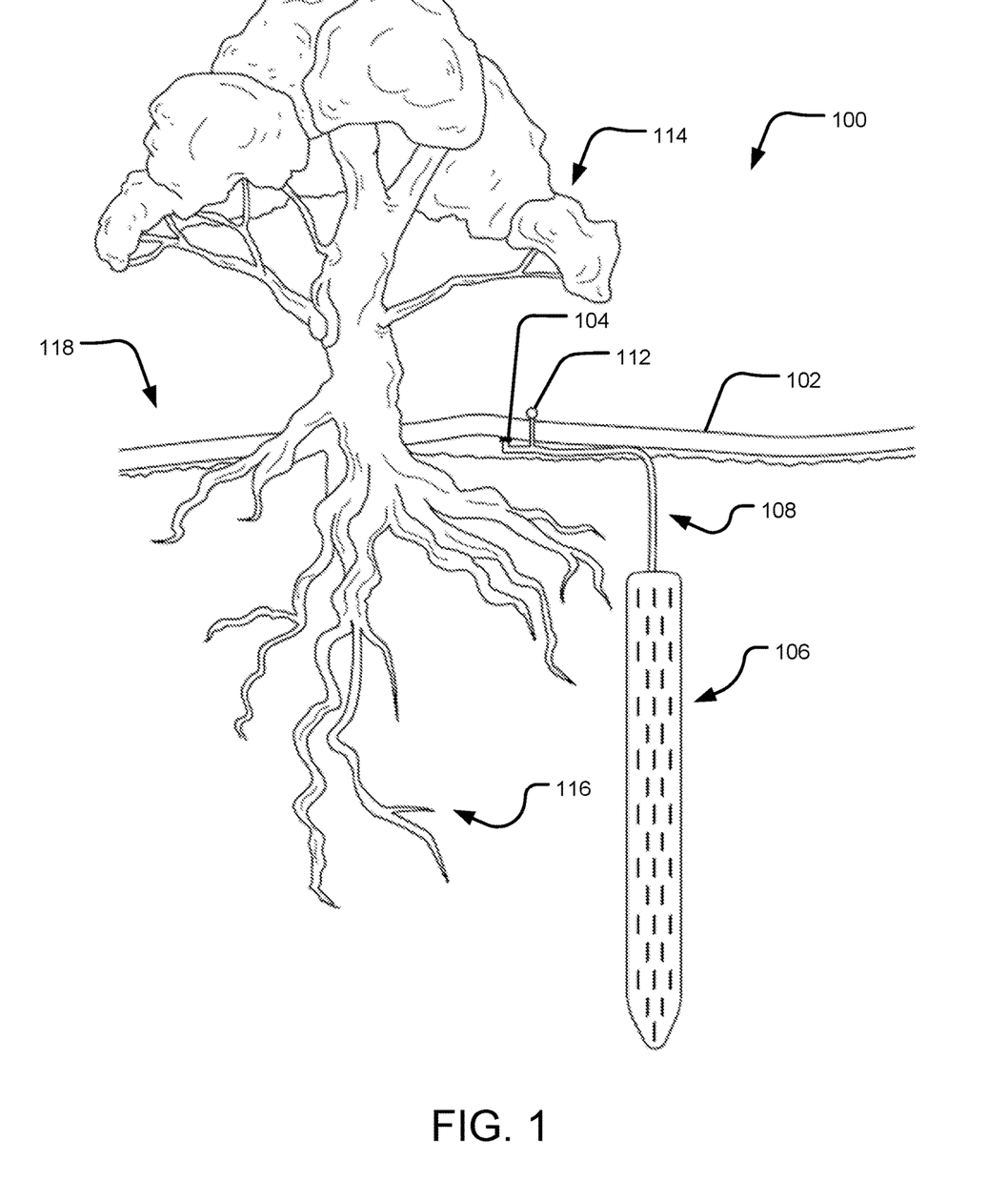
FIG. 1 is an elevation view of a subterranean irrigation system according to at least one embodiment of the present disclosure.

Turning to FIG. 1, an elevation view of at least one embodiment of a subterranean irrigation system 100 is illustrated. It will be appreciated that FIG. 1 is not drawn to scale. In the illustrated embodiment, one irrigation system 100 is shown, though it will be appreciated that in other embodiments, the irrigation system 100 may comprise more than one irrigation system 100. The irrigation system 100 is configured to supply fluid (whether water, nutrients, treatments, chemicals, or any other liquid or semi-liquid solution) to a target zone or location (e.g., near or at a desired root system). The irrigation system 100 is also capable of delivering nutrients and other fertilizers and chemicals, if and when desired, during the lifespan of the plant(s). The irrigation system 100 is in fluid communication with a fluid source (not shown) via a surface irrigation hose 102 and an emitter 104. The irrigation system 100 also comprises a reservoir 106 in fluid communication with the surface irrigation hose 102 via a connector 108.

The surface irrigation hose 102 may receive fluid from the fluid source (which may be a permanent, temporary, or mobile fixture). In some embodiments, the surface irrigation hose 102 is consistently full of fluid from the fluid source. In other embodiments, the surface irrigation hose 102 may intermittently receive fluid from the fluid source (e.g., the fluid source may release fluid for certain amounts of time at different times of the day). In some embodiments the emitter 104 is configured to constantly deliver small amounts of fluid to the reservoir 106. In other embodiments, the emitter 104 may be configured to control a fluid flow from the surface irrigation hose 102 to the reservoir 106. In other words, the emitter 104 may control when and how much fluid is delivered from the surface irrigation hose 102 to the reservoir 106. The emitter 104 may also control a fluid flow rate of fluid delivered to the reservoir 106, which may cause one or more self-sealing openings 110 on the reservoir 106 to automatically open or close based on the resultant fluid pressure in the reservoir 106, as will be described in detail in FIGS. 3-5. The connector 108 comprises tubing 122 (which may be spaghetti tubing), an emitter 104, and fastener straps 112.

In some embodiments, the irrigation system 100 comprises a plurality of reservoirs 106 and/or connectors 108. In such embodiments, the plurality of reservoirs 106 may be in fluid communication with the same surface irrigation hose 102 or different surface irrigation hoses 102. In various embodiments, one or more reservoirs 106 are placed near or within a root structure 116 of a target perennial planting or crop 114, as shown in FIG. 1. The number of reservoirs 106 placed and the locations are based upon the variety of plants being fed. The reservoir(s) 106 are inserted deeply enough under the surface to break through hardpan layers that often form when using surface irrigation methods. In some examples, a top of the reservoir 106 may be buried between about 1" to about 18" under a surface 118 of the ground, or any distance therebetween. In a preferred embodiment, a top of the reservoir 106 may be buried between about 1" to about 6" under the surface 118 of the ground. The reservoir 106 may extend either directly downward or downward at an angle up to 45 degrees away from perpendicular to a plane of the ground. By burying the reservoirs 106, one or more mini aquifers may be formed, which deliver fluids more deeply underground and may cause roots to grow more deeply. Deep roots may lead to healthier, more robust, disease-resistant, and wind-resistant crops and/or plants. By delivering fluids below the surface of the ground, the hard-pan layer that can form when nutrients and chemicals soak into the ground to a certain depth and concentrate in one area may be prevented. Such prevention of the hard-pan layer is desirable as the hard-pan layer can make it difficult for roots to break through the hard-pan layer and/or for fluids to flow or seep below the hard-pan layer. Further, delivering fluids below ground may alleviate byproducts of water pooling on the surface of the ground such as, but not limited to, weeds, pests, and/or fungus and may prevent the downhill flow of fluids that may result in plants situated at lower elevations receiving more fluid than those at a higher elevation.

Figure 2:
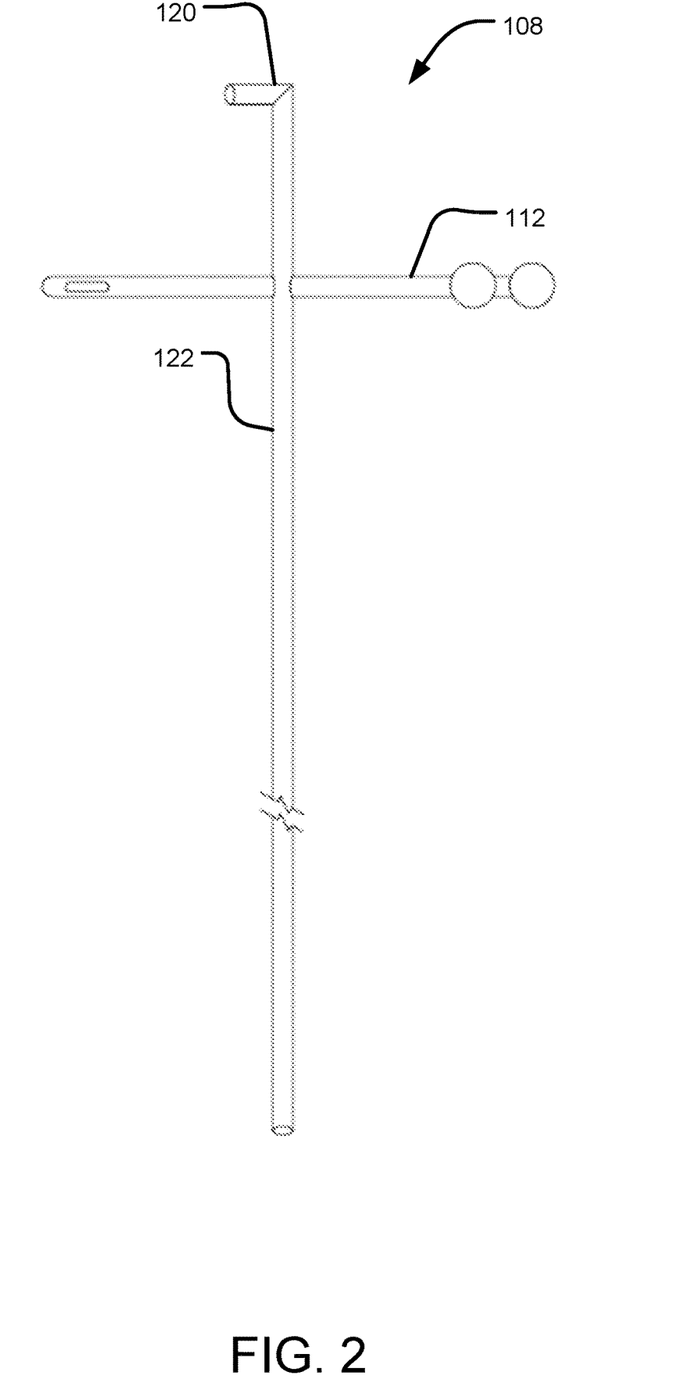
FIG. 2 is a front view of a connector according to at least one embodiment of the present disclosure.

FIG. 2 shows at least one embodiment of the connector 108. The connector 108 is in fluid communication with the surface irrigation hose 102—and more specifically the surface irrigation emitter 104 (shown in FIG. 1)—and the reservoir 106 to deliver fluid from the surface irrigation hose 102 to the reservoir 106. The connector 108 interfaces with the surface irrigation emitter 104 via a connecting portion 120 at one end of the connector 108. As shown, the connecting portion 120 is L-shaped in the illustrated embodiment, though in other embodiments, the connecting portion 120 may be any shape. The L-shaped bend or 90-degree bend is positioned within an inch of the connection between the surface irrigation hose 102 and the connecting portion 120. Such bend helps prevent the connector 108 from extending away from the surface irrigation hose 102. By keeping the connector 108 close to the surface irrigation hose 102, the connector 108 (and the reservoir 106) may not be subjected to or may be subjected to less disturbances to the surface irrigation hose 102 during, for example, field maintenance and harvesting. More specifically, farm machinery and workers may get tangled in loose connector(s) 108 and the connector(s) 108 may detach or cause the reservoir 106 to become mispositioned. However, by providing a 90-degree bend at the connecting portion 120 and enabling the connector 108 to connect perpendicularly to surface irrigation hose 102 and run parallel to and near the surface irrigation hose 102, the connector 108 is less likely to detach or cause a disturbance to the reservoir 106.

The connector 108 also includes fastener straps 112 that secure the connecting portion 120 and/or a portion of the tubing 122 to the surface irrigation hose 102 and the emitter 104. In other embodiments, the fastener straps 112 may secure the connector 108 and/or the portion of the tubing 122 to any component such as, for example, a crop, a plant, or a fixture (e.g., a pole, wiring, etc.). The fastener straps 112 may also reinforce the connection between the surface irrigation hose 102 and the connecting portion 120 to prevent detachment between the surface irrigation hose 102 and the connecting portion 120. The fastener straps 112 may also keep the length of the connecting portion 120 and/or a portion of the tubing 122 near to or at the surface irrigation hose 102 and away from the space between rows of surface irrigation supply hoses 102, in which machinery operates and workers may travel. The fastener straps 112 may be any type of fastener strap such as, for example, ratchet straps, tie-down straps, hook and loop straps, polyurethane straps with buckles (e.g., VOILE STRAPS®), or the like.

Distal to the connecting portion 120 is a desired length of the tubing 122 that travels horizontally along the supply hose until it is directed vertically or at an angle down into the ground and to the root system and the reservoir 106. The connecting portion 120 may be a component separate from the tubing 122 or may be formed as one component with the tubing 122. The tubing 122 and/or the connecting portion 120 may be flexible or rigid. In some embodiments, the tubing 122 may be flexible and the connecting portion 120 may be rigid, or vice versa. In some embodiments, the tubing 122 and/or the connecting portion 120 comprises spaghetti tubing and, more specifically, may comprise polyethylene drip distribution tubing employed for its flexibility and durability in extreme conditions, such as intense sun exposure, heat and cold, wind, and precipitation. In other embodiments, the tubing 122 and/or the connecting portion 120 may comprise piping.

Figure 3:
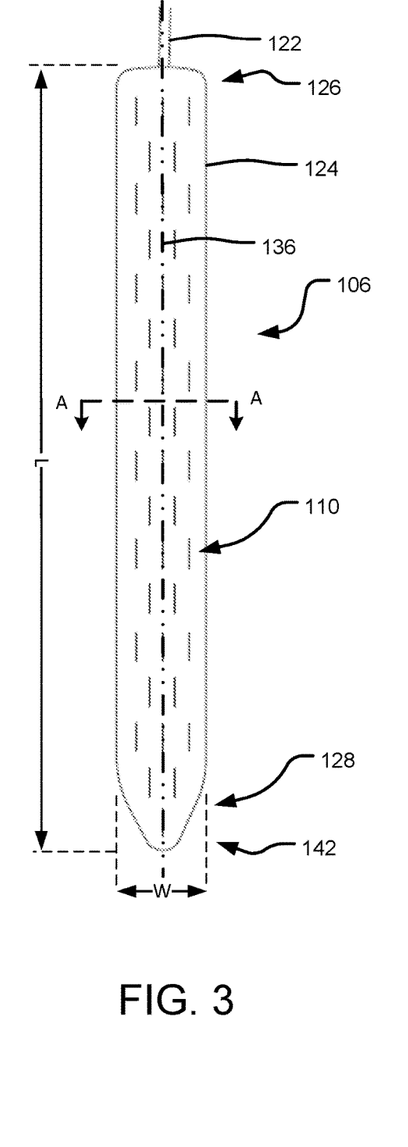
FIG. 3 is a front view of a reservoir according to at least one embodiment of the present disclosure.
Figures 4, 5:
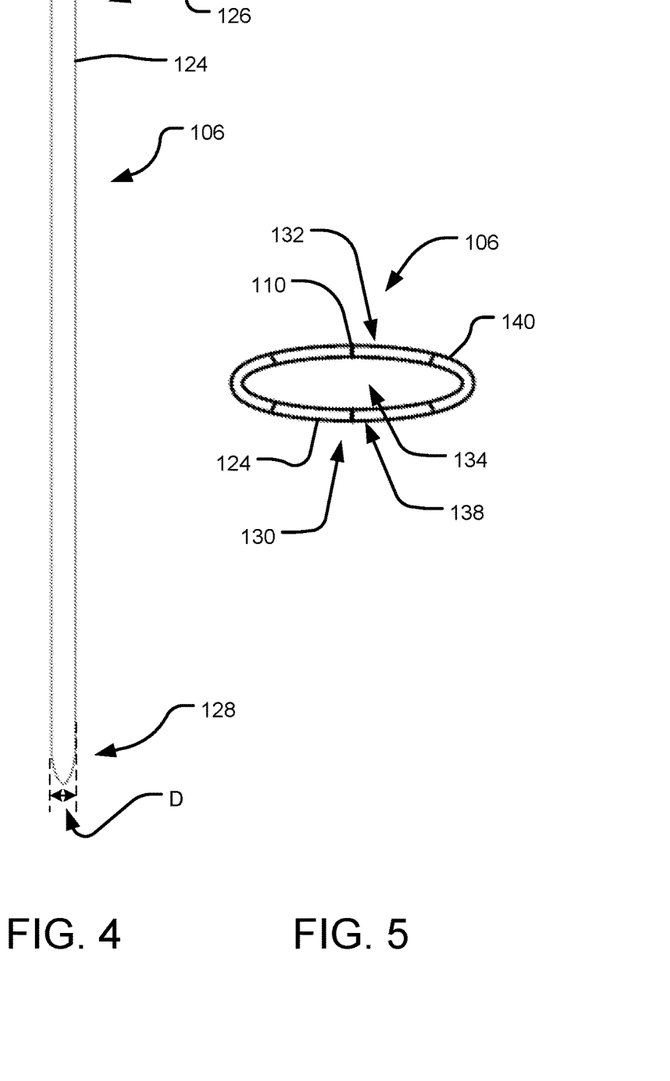
FIG. 4 is a side view of a reservoir according to at least one embodiment of the present disclosure.
FIG. 5 is a cross-sectional top view of the reservoir taken along line A-A shown in FIG. 3 according to at least one embodiment of the present disclosure.

FIGS. 3-5 show one embodiment of the reservoir 106, which may also be referred to as a soaker chamber, from a front view, a side view, and a cross-sectional top view taken from line A-A, respectively. The reservoir 106 comprises a body 124 extending from a first end 126 to a second end 128 and includes an outer surface 138 having a first surface 130 (e.g., a front surface) opposite a second surface 132 (e.g., a rear surface). The reservoir 106 also comprises a plurality of self-sealing openings 110 disposed on the outer surface 138 that penetrate through the body 124. The reservoir 106 is configured to exude desired fluids into a target medium (e.g., soil) via the plurality of self-sealing openings 110. The geometry and material of the reservoir 106 enables the plurality of self-sealing openings to be self-sealing when fluids are not being released from the reservoir 106.

The reservoir 106 is connected to a distal end of the tubing 122 at the first end 126 and comprises a pointed end 142 at the second end 128, which may enable or provide support for pushing the reservoir 106 into the ground. In other embodiments, the second end 128 may be rounded, squared, or any shape. The reservoir 106 is generally rectangularly shaped with the pointed end 142 when viewed from the front (shown in FIG. 3) and oval or ring shaped when viewed from the cross-sectional top view (shown in FIG. 5). In other embodiments, the reservoir 106 may be any shape when viewed from the front or the top such as, for example, oval, square, triangular, spherical, etc. As further shown in the cross-sectional top view, the reservoir 106 may be hollow and may form a cavity 134 for storing fluid. However, in other embodiments, the reservoir 106 may have a horizontal cross-section, meaning it is not ring-shaped or hollow on the inside. Rather, the reservoir 106 may be a solid oval shape (or any shape) when viewed in the cross-sectional view. In such embodiments, the reservoir 106 may comprise a material capable of absorbing and storing fluid. Alternatively, the reservoir 106 may comprise a void between, for example, an outer wall and a hollow inner wall in which to store fluid. In embodiments where the reservoir comprises the cavity 134, the cavity 134 may be lined with a filter system that permits the movement of fluid into the root system while preventing the passage of soil and debris into the cavity 134.

The reservoir 106 has a length L, a width W, and a depth D. In other embodiments in which the reservoir 106 is a different shape, the reservoir 106 may include other dimensions. In the illustrated embodiment, the length L is greater than the width W and the width W is greater than the depth D. It will be appreciated that in other embodiments, the length L may be equal to or less than the width W and the width W may be equal to or less than the depth D. The shape of the reservoir 106 allows for a large amount of surface area by which to deliver the fluids to the target zone, which creates a large volume of fluid forming a mini aquifer at the target zone (e.g., the desired root zone). The size and shape of the reservoir 106 and the plurality of self-sealing openings 110 along with the subsurface location at which the reservoir 106 is installed combine to cause a vertically elongated area of fluid saturation to form under the ground. More specifically, the length L of the reservoir 106 creates a depth of saturation and the width W creates a width of saturation. In some embodiments, the area of saturation may be between 6 feet to 9 feet by 2 feet to 5 feet. In other embodiments, the area of saturation may be less than 6 feet to 9 feet by 2 feet to 5 feet or greater than 6 feet to 9 feet by 2 feet to 5 feet.

During installation, a tool in the same shape as the reservoir 106—but slightly larger in dimension than the reservoir 106—is pressed or pounded into the ground and then removed. The tool forms a hole of a desired shape and size into which the reservoir 106 can be inserted into. The shape of the tool (and thus reservoir 106) enables pressing this hole into the ground with more ease and less energy than a device that is not long and skinny. More specifically, the depth D and the pointed end 142 enable easy pressing of the reservoir 106 into the ground.

The reservoir 106 is configured to distribute fluid underneath the ground surface to a target zone such as a perennial planting's or other crop's root system. The reservoir 106 may be formed from one piece, which may be beneficially more durable and cost-effective compared to conventional devices which may be assembled from multiple parts. In other embodiments, the reservoir 106 may be formed from one or more pieces. In preferred embodiments, the reservoir 106 is comprised of non-porous polyethylene, similar to a rubberized plastic. The material allows the reservoir 106 to be rigid enough to maintain its shape, while being flexible enough to expand slightly from its original volume and then contract again to its original dimensions. In other embodiments, the reservoir 106 is comprised of any other non-porous materials—for example metal, high-density polyethylene, or polypropylene—known in the art that are elastic enough to allow a plurality of self-sealing openings 110 to open and rigid enough for the reservoir 106 to both maintain its shape after insertion into the ground and cause the plurality of self-sealing openings 110 to seal under neutral or negative internal pressure in the reservoir 106.

Each of the first surface 130 and the second surface 132 comprise the plurality of self-sealing openings 110 disposed on the outer surface 138, which are configured to move between a first configuration (e.g., a closed configuration) and a second configuration (e.g., an open configuration). It will be appreciated that though a plurality of self-sealing openings 110 is described throughout the disclosure, in some instances the reservoir 106 may comprise one self-sealing opening 110. In some embodiments, only one of the first surface 130 or the second surface 132 may comprise the plurality of self-sealing openings 110. The plurality of self-sealing openings 110 are configured to permit fluid to exit the reservoir 106 and emit into the root system when in the second configuration and are also configured to prevent debris from entering the reservoir 106 when in the first configuration. More specifically, the plurality of self-sealing openings 110 are vertical, or parallel to a center or longitudinal axis 136 (shown in FIG. 3) of the reservoir 106, and perpendicular to a horizontal curvature of the convex outer surface 138 (shown in FIG. 5). Such configuration enables the plurality of self-sealing openings 110 to self-seal when there is negative or neutral pressure in the reservoir 106. The plurality of self-sealing openings 110 also helps to enable the dilated reservoir's slight expansion. The self-sealing openings 110 may be a straight line, linear slits, a wave, or form any pattern or shape. The plurality of self-sealing openings 110 are cut using a sharp, thin cutting device (e.g., a knife, a blade, etc.) that does not remove any of the material. In some embodiments, the plurality of self-sealing openings 110 are cut straight through the outer surface 138 and a wall 140 and into the cavity 134 of the reservoir 106, for example cut at an angle between about 85 degrees to 95 degrees relative to a plane tangential to the outer surface 138. In other embodiments, the plurality of self-sealing openings 110 are cut at an angle between about 30 degrees to 60 degrees relative to a plane tangential to the outer surface 138. It will be appreciated that in other embodiments, the plurality of self-sealing openings 110 may be cut at an angle less than 30 degrees or greater than 60 degrees relative to the plane tangential to the outer surface 138. For example, the self-sealing openings 110 may be cut into the outer surface 138 to the cavity 134 at an angle between about −5 degrees to 5 degrees relative to the plane tangential to the outer surface 138. In another example, the self-sealing openings 110 may be cut into the outer surface 138 of the cavity 134 at an angle between about 85 degrees to 95 degrees relative to the plane tangential to the outer surface 138.

In embodiments where the plurality of self-sealing openings 110 are shaped as straight lines, the straight lines are parallel to the center or longitudinal axis 136. In a some embodiments, the self-sealing openings 110 have a length between about 0.2 inch to about 2.0 inches, or 0.2 inch, 0.25 inch, 0.4 inch, 0.5 inch, 0.6 inch, 0.75 inch, 0.8 inch, 1.0 inch, 1.2 inch, 1.25 inch, 1.4 inch, 1.5 inch, 1.6 inch, 1.75 inch, 1.8 inch, 2.0 inches, or any range therebetween. In a preferred embodiment, the plurality of self-sealing openings 110 can have a length between about ¼ inch to about 1.5 inches. In other embodiments the plurality of self-sealing openings 110 can be less than ¼ inch or greater than 1.5 inches. Each of the plurality of self-sealing openings can have the same length or may vary in length. For example, in some embodiments the self-sealing openings 110 closer to the first end 126 or the second end 128 may have a length less than self-sealing openings 110 closer to a mid-section of the reservoir 106. In some embodiments, the self-sealing openings 110 closer to the first end 126 a length less than the self-sealing openings 110 closer to the second end 128 of the reservoir 106 such that an even amount of water is distributed near the first and second ends 126, 128. The plurality of self-sealing openings 110 may be disposed on the first surface 130 and/or the second surface 132 in a pattern. As illustrated, the plurality of self-sealing openings 110 are positioned in offset rows. In other instances, the plurality of self-sealing openings 110 may be positioned in any pattern or configuration.

The number and size of the self-sealing openings 110 is limited to ensure that their number or size does not compromise the structural integrity of the reservoir 106. In some embodiments, the number of self-sealing openings 110 can be between one self-sealing opening per square inch to one self-sealing opening per every 12 square inches, or one self-sealing opening per every square inch, one self-sealing opening per every 2 square inches, one self-sealing opening per every 3 square inches, one self-sealing opening per every 4 square inches, one self-sealing opening per every 5 square inches, one self-sealing opening per every 6 square inches, one self-sealing opening per every 7 square inches, one self-sealing opening per every 8 square inches, one self-sealing opening per every 9 square inches, one self-sealing opening per every 10 square inches, one self-sealing opening per every 11 square inches, one self-sealing opening per every 12 square inches, or any range therebetween. It will be appreciated that some portions of the reservoir 106 may comprise a first concentration of self-sealing openings and other portions of the reservoir 106 may comprise a second concentration of self-sealing openings. Moreover, the number and size of the self-sealing opening 110 can vary depending on the specific soil in which the irrigation system 100 will be used or the specific plant the irrigation system 100 will be used to water, the crop type, and/or the fluid pressure being supplied by the irrigation system 100.

When the irrigation system 100 is engaged fluid flows through the system 100 (by, for example, pumps) to the surface irrigation hose 102 and through the emitter 104 to the connector 108. When the fluid pressure rises inside of the reservoir 106, due to fluid being fed into the reservoir 106 via the connector 108, fluid pressure in the reservoir 106 increases and results in positive pressure in the reservoir 106 relative to an external pressure (e.g., an ambient pressure or ground pressure). This positive pressure causes the reservoir 106 and the self-sealing openings 110 to move into the second configuration and expand and release fluid into the soil. More specifically, because of the convex horizontal curve of the wall 140 and the self-sealing openings 110 being positioned perpendicular to the horizontal curve, the positive pressure will push open the self-sealing openings 110 and allow fluid to be released from the cavity 134 to the surrounding environment (e.g., the ground). The flow rate of the fluid released from the reservoir 106 may vary based on the emitter 104 that releases fluid from the surface irrigation hose 102. The flow rate may also vary based on a size of the reservoir 106 and the number and length of the self-sealing openings 110 (e.g., larger and more numerous self-sealing openings may increase the flow rate). In some embodiments, the flow rate may be between about ½ gallon/hour to about 6 gallons/hour. In other embodiments, the flow rate may be less than ½ gallon/hour or greater than 6 gallons/hour.

When the pressure in the reservoir 106 returns to neutral or negative (due to, for example, fluid releasing from the reservoir 106 and/or the irrigation system 100 causing the fluid flow to end), the self-sealing openings 110 move to the first configuration and the self-sealing openings 110 close and seal the reservoir 106 from intrusion of outside substances, e.g., dirt, rocks, other debris, and roots in the soil. As previously described, in some embodiments, the reservoir 106 has an elongated oval shape to permit fluid to be released through the self-sealing openings 110 when there is positive pressure in the reservoir 106. The reservoir 106 may have a concave interior the same way as a balloon, which causes the reservoir 106 and its self-sealing openings 110 to expand under positive pressure from within (e.g., moves to the second configuration). The self-sealing openings 110 also seal themselves from outside substances (e.g., moves to the first configuration) when there is neutral or negative interior pressure because of their shape and orientation relative to the outer surface 138 of the reservoir 106. Specifically, the outer surface 138 is convex and acts in the same way as an arch, which causes the reservoir 106 and its self-sealing openings 110 to contract and become sealed under pressure from outside of the reservoir 106. In preferred embodiments, the mostly-rigid and only slightly-flexible material from which the reservoir 106 is manufactured from also causes the reservoir 106 to revert to its original dimensions and the self-sealing openings 110 to close when the pressures inside and outside are equal.

As previously described, the irrigation system 100 may comprise one reservoir 106 or more than one reservoir 106. The number of reservoirs 106 may be dependent on the size, type, and age of the target crop or plant. For example, a new plant (or start), vines, and bushes may use one reservoir 106. Two reservoirs 106 may be sufficient for small to medium trees (e.g., citrus trees, almond trees, pistachio trees). Three to four reservoirs 106 may be used for large trees (e.g., walnut trees, pecan trees).

Figure 6:
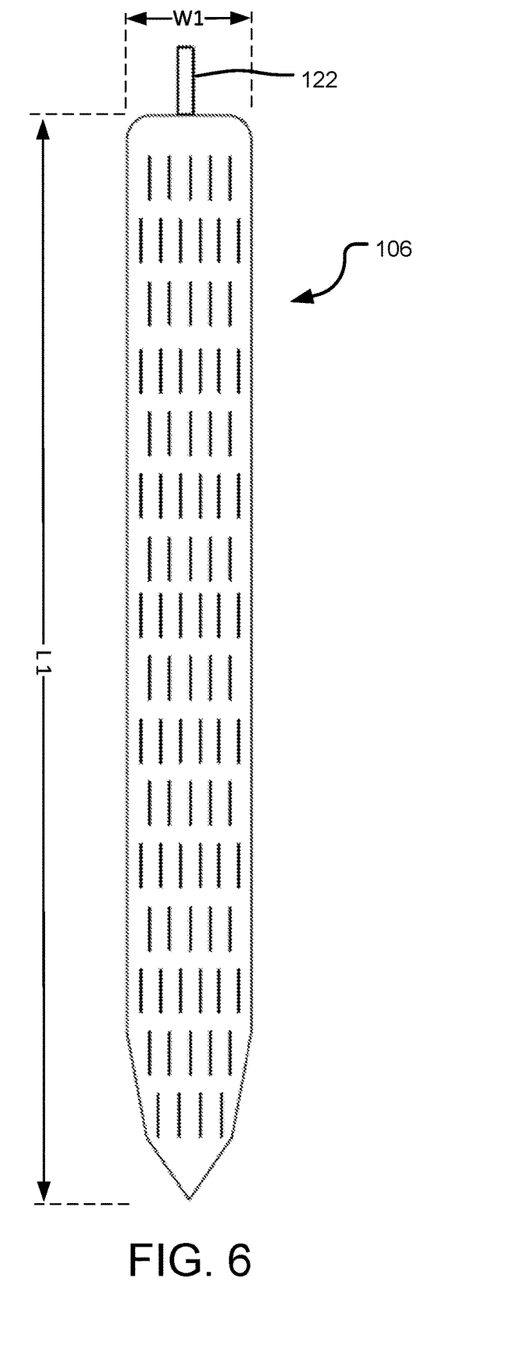
FIG. 6 is a front view of a reservoir according to at least one embodiment of the present disclosure.
Figure 7:
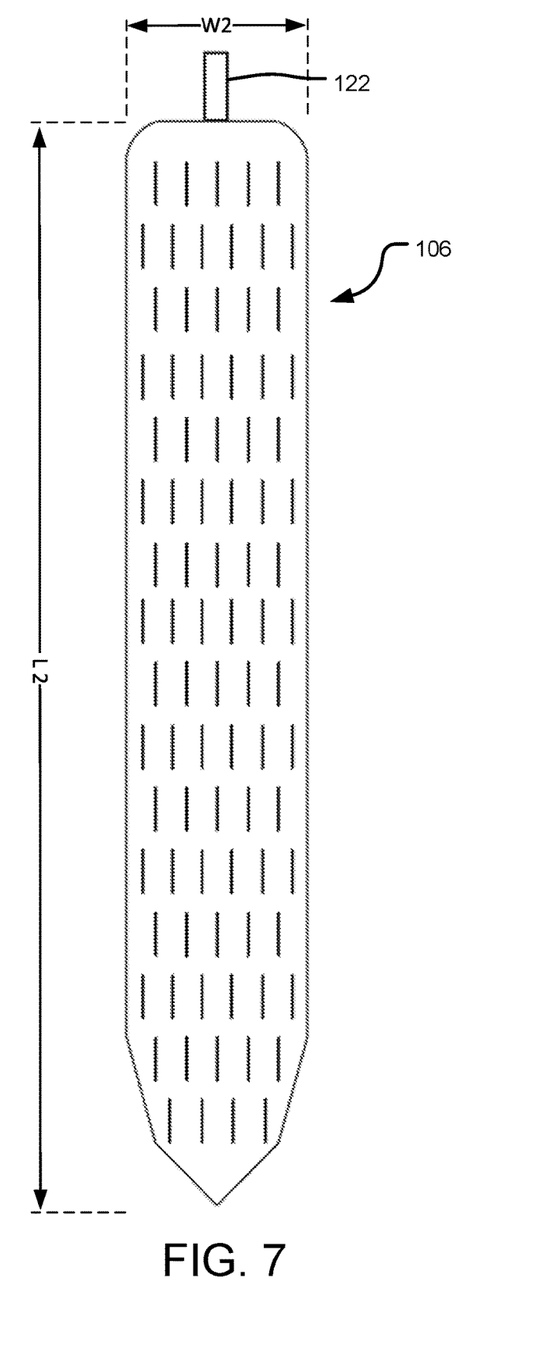
FIG. 7 is a front view of a reservoir according to at least one embodiment of the present disclosure.

Turning to FIGS. 6 and 7, a first preferred embodiment of the reservoir 106 and a second preferred embodiment of the reservoir 106 are shown, respectively. In the first preferred embodiment of the reservoir 106, the reservoir 106 has a first length L1 of about 13 inches long, a first width W1 of about 1.5 inches wide, and a first depth of about ⅜ inch deep. In other embodiments, the length L1 is less than or greater than 13 inches and/or the width W1 is less than or greater than 1.5 inches. In alternative embodiments, the depth D1 is less than or greater than ⅜ inch deep.

In a second preferred embodiment of the reservoir 106, a second L2 is about 13 inches long, a second width W2 is about 2 inches wide, and a second depth about ⅜ inch deep. In various embodiments, the second length W2 is less than or greater than 2 inches.

In various embodiments, the reservoir 106 has a length of about 3 inches, about 6 inches, about 9 inches, about 12 inches, about 15 inches, about 18 inches, about 21 inches, or about 24 inches, or any range therebetween. In various embodiments, the reservoir 106 has a width of about 1.0 inch, 1.25 inch, 1.5 inch, 1.75 inch, 2.0 inches, 2.25 inches, 2.5 inches, 2.75 inches, 3.0 inches, or any range therebetween. In various embodiments, the reservoir 106 has a depth of about 0.25 inch, ⅜ inch, 0.5 inch, ⅝ inch, 0.75 inch, 1.0 inch, or any range therebetween.

In some embodiments, a thickness of the wall 140 of the reservoir 106 is between about ¹⁄₁₆ inch to about ¹⁄₃₂ inch. In various embodiments, the thickness of the wall 140 may be less than ¹⁄₁₆ inch and greater than ¹⁄₃₂ inch. In some embodiments, the thickness of the wall 140 of the reservoir 106 is about ¹⁄₆₄ inch, ¹⁄₃₂ inch, ¹⁄₁₆ inch, ⅛ inch, ¼ inch, or any range therebetween. The thickness of the wall 140 may depend on the rigidity of the material used as more rigid materials may allow for thinner walls and more flexible materials may use thicker walls.

Though specific dimensions for the reservoir 106 and the self-sealing openings 110 are described above, it will be appreciated that the dimensions of the reservoir 106 and the number and length of the self-sealing openings 110 may vary in relation to the density of the soil, the fluid pressure provided by the underlying irrigation system 100, and the size of the plants and target root areas. For example, as the soil density decreases, the number and the length of the self-sealing openings 110 may increase and as the soil density increase(s), the number and the length of the self-sealing openings 110 may decrease. Further, if the irrigation system 100 provides low fluid pressure, then the self-sealing openings may be longer—and thereby easier to open with less pressure. If the irrigation system 100 provides high fluid pressure, then the self-sealing openings 110 may be smaller as the high pressure may be sufficient to open smaller self-sealing openings 110. Similarly, as the size of a target plant increases or decreases, the dimensions of the reservoir 106 may increase or decrease relative to the size of the target plant. It will be appreciated that as a target crop or plant grows, more reservoirs 106 may be installed or reservoirs 106 of different dimensions may be installed to accommodate a larger plant or crop.

Additionally, various features/components of one embodiment may be combined with features/components of another embodiment. For example, features/components of one figure can be combined with features/components of another figure or features/components of multiple figures. To avoid repetition, every different combination of features has not been described herein, but the different combinations are within the scope of this disclosure. Additionally, if details (including angles, dimensions, etc.) about a feature or component are described with one embodiment or one figure, then those details can apply to similar features of components in other embodiments or other figures.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

It is to be appreciated that any feature described herein can be claimed in combination with any other feature(s) as described herein, regardless of whether the features come from the same described embodiment. Any one or more aspects described herein can be combined with any other one or more aspects described herein. Any one or more features described herein can be combined with any other one or more features described herein. Any one or more embodiments described herein can be combined with any other one or more embodiments described herein.

What is claimed is:

1. A self-sealing reservoir for dispersing fluid to a target zone comprising:
   a body having an outer surface defining a first surface opposite a second surface and a cavity for storing fluid; and
   a plurality of self-sealing openings on at least one of the first surface or the second surface, the plurality of self-sealing openings configured to move between a first configuration in which the self-sealing openings are closed and a second configuration in which the self-sealing openings are open and permit fluid to release from the cavity to the target zone,
   wherein the self-sealing openings are in the first configuration when a fluid pressure in the reservoir is at least one of zero pressure or negative pressure and the self-sealing openings are in the second configuration when the reservoir is full of fluid and the fluid pressure in the reservoir is a positive pressure.

2. The self-sealing reservoir of claim 1, wherein the self-sealing openings are positioned parallel to a center or longitudinal axis of the reservoir and perpendicular to a horizontal curvature of the outer surface.

3. The self-sealing reservoir of claim 2, wherein the self-sealing openings comprise linear slits parallel to the center or longitudinal axis.

4. The self-sealing reservoir of claim 1, wherein the self-sealing openings have a length between ¼ inch to 1.5 inches.

5. The self-sealing reservoir of claim 1, wherein the self-sealing openings are cut into the outer surface to the cavity at an angle between 30 degrees to 60 degrees relative to a plane tangential to the outer surface.

6. The self-sealing reservoir of claim 1, wherein the reservoir has a length L, a width W, and a depth D, wherein the length L is greater than the width W and the width W is greater than the depth D.

7. The self-sealing reservoir of claim 1, wherein the body extends from a first end to a second end, wherein the reservoir is in fluid communication with a fluid source at the first end and comprises a pointed tip with a smooth exterior surface at the second end.

8. The self-sealing reservoir of claim 1, wherein the outer surface is convex.

9. The self-sealing reservoir of claim 1, wherein the reservoir is one piece.

10. The self-sealing reservoir of claim 1, wherein the reservoir comprises at least one of non-porous polyethylene, high-density polyethylene, or polypropylene.

11. The self-sealing reservoir of claim 1, wherein the body is an elongated body extending a length L, and wherein the first surface and the second surface extend along the length L.

12. The self-sealing reservoir of claim 1, wherein the reservoir has an oval shape when viewed in cross-section.

13. A self-sealing non-porous reservoir for dispersing fluid to a target zone comprising:
   a body extending from a first end to a second end along a center or longitudinal axis, the reservoir having an outer surface defining a first surface opposite a second surface and a cavity for storing fluid, wherein the outer surface is convex; and
   a plurality of self-sealing openings on at least one of the first surface or the second surface and positioned parallel to the center or longitudinal axis and perpendicular to a horizontal curvature of the convex outer surface, the self-sealing openings configured to move between a first configuration in which the self-sealing openings are closed and a second configuration in which the self-sealing openings are open and permit fluid to release from the cavity to the target zone,
   wherein the self-sealing openings are in the first configuration when a fluid pressure in the reservoir is at least one of zero pressure or negative pressure and the self-sealing openings are in the second configuration when the reservoir is full of fluid and the fluid pressure in the reservoir is a positive pressure relative to an external pressure.

14. The self-sealing non-porous reservoir of claim 13, wherein the reservoir is one piece.

* * * * *